United States Patent
Braunheim et al.

(10) Patent No.: US 9,044,696 B2
(45) Date of Patent: Jun. 2, 2015

(54) MODULE INSERT FOR INSTALLATION IN A LIQUID FILTER

(75) Inventors: Michael Braunheim, Göppingen (DE); Matthias Gänswein, Esslingen (DE); Jörg Hrodek, Mittlern (AT); Sven Siegle, Winnenden (DE); Richard Wlassa, Stuttgart (DE)

(73) Assignee: Mahle International GmbH (DE)

( * ) Notice: Subject to any disclaimer, the term of this patent is extended or adjusted under 35 U.S.C. 154(b) by 1164 days.

(21) Appl. No.: 13/055,867

(22) PCT Filed: Jul. 17, 2009

(86) PCT No.: PCT/EP2009/059228
§ 371 (c)(1),
(2), (4) Date: Apr. 15, 2011

(87) PCT Pub. No.: WO2010/012612
PCT Pub. Date: Feb. 4, 2010

(65) Prior Publication Data
US 2011/0186501 A1   Aug. 4, 2011

(30) Foreign Application Priority Data
Jul. 26, 2008 (DE) .......... 10 2008 034 904

(51) Int. Cl.
*B01D 35/30* (2006.01)
*B01D 36/00* (2006.01)
*B01D 17/02* (2006.01)
*F02M 37/22* (2006.01)
*B01D 29/11* (2006.01)
*C02F 1/28* (2006.01)
*B01D 17/04* (2006.01)

(52) U.S. Cl.
CPC ............... *B01D 36/005* (2013.01); *C02F 1/28* (2013.01); *B01D 17/0214* (2013.01); *B01D 17/045* (2013.01); *F02M 37/223* (2013.01); *B01D 29/114* (2013.01); *B01D 36/008* (2013.01); *F02M 37/221* (2013.01)

(58) Field of Classification Search
CPC .................................................. B01D 36/008
See application file for complete search history.

(56) References Cited

U.S. PATENT DOCUMENTS 5,662,801 A * 9/1997 Holland .................. 210/266
7,040,299 B2   5/2006 Dickerson
(Continued)

FOREIGN PATENT DOCUMENTS

DE   102004036070 A1   2/2006
DE   102004059062 A1   6/2006
(Continued)

OTHER PUBLICATIONS

English abstract for DE102004036070, Feb. 2006.
(Continued)

*Primary Examiner* — Terry Cecil
(74) *Attorney, Agent, or Firm* — Fishman Stewart Yamaguchi PLLC

(57) ABSTRACT

A module insert includes at least one water level sensor, at least one valve and at least one flow channel for the water. The module insert has at least one container having sorbent mechanism for collecting contaminants from the separated water. A pressure-resistant housing is configured to protect an interior of the module insert from the pressure of the fuel.

20 Claims, 5 Drawing Sheets

(56) References Cited

U.S. PATENT DOCUMENTS

| | | |
|---|---|---|
| 7,591,951 B2 * | 9/2009 | Linhart et al. ............... 210/651 |
| 2006/0070956 A1 * | 4/2006 | Herrmann et al. ............ 210/744 |
| 2006/0083878 A1 * | 4/2006 | Bauman ...................... 428/35.7 |
| 2006/0118478 A1 | 6/2006 | Linhart et al. |
| 2006/0207924 A1 | 9/2006 | De La Azuela et al. |
| 2008/0087597 A1 | 4/2008 | Johann et al. |
| 2010/0096304 A1 * | 4/2010 | Ganswein et al. ............. 210/86 |
| 2010/0101984 A1 | 4/2010 | Roesgen et al. |
| 2010/0258488 A1 * | 10/2010 | Braunheim .................. 210/109 |

FOREIGN PATENT DOCUMENTS

| | | |
|---|---|---|
| DE | 102006039581 A1 | 3/2008 |
| DE | 102007039661 A1 | 3/2008 |
| DE | 102006049084 A1 | 4/2008 |
| DE | 202006019301 U1 | 4/2008 |
| DE | 102007054770 A1 | 5/2009 |
| EP | 1581736 A1 | 10/2005 |
| EP | 1726818 A2 | 11/2006 |
| JP | 63-224707 A | 9/1988 |
| WO | WO-01/30478 A2 | 5/2001 |
| WO | WO-2005/049173 A1 | 6/2005 |

OTHER PUBLICATIONS

English abstract for DE102007039661, Mar. 2008.
English abstract for EP1726818, Nov. 2006.
English abstract for JP63-224707, Sep. 1988.

* cited by examiner

MODULE INSERT FOR INSTALLATION IN A LIQUID FILTER

CROSS-REFERENCES TO RELATED APPLICATION

This application claims priority to German patent application DE 10 2008 034 904.6 filed on Jul. 26, 2008 and PCT application PCT/EP2009/059228 filed on Jul. 17, 2009, which are hereby incorporated by reference in their entirety.

TECHNICAL FIELD

The present invention relates to a module insert for installation in a liquid filter for cleaning the separated water, in particular for installation in a fuel filter.

BACKGROUND

From WO 01/30478, a liquid filter is known which has a functional support insert. Said functional support is suitable to supply and discharge the fuel to be cleaned to the filter element and to receive several further elements such as, e.g., a check valve. The functional support is seated in the lower part of the filter housing and unpurified oil flows around it. The filter housing is closed by a base which has openings for the different ports of the functional support. Moreover, said functional support has a drainage channel which is necessary for changing the filter. Said functional support is designed for the use in oil filters and thus is not suited for the use in a fuel filter.

In U.S. Pat. No. 7,040,299, a fuel filter is shown in which in the lower part of the filter housing, a strainer with integrated fuel heater is inserted on the dirty side. The filter housing has a plurality of inlets and outlets and connection lines. Since the filter also separates the water contained in the fuel, a water drain with water level sensor is provided. A disadvantage of this construction is that the discharged water is not sufficiently cleaned. In order to clean it to an extent that it is safe to discharge the water into the environment, a further component, e.g., external component is necessary.

From EP 1 581 736 and from DE 10 2006 039 581, a fuel filter is known which has a further filter attached on the filter housing for cleaning the discharged water.

SUMMARY

Such a filter is also known from JP 63224707. However, a disadvantage of this type of fuel filter is that the filters are structured to have a relatively large volume and therefore there is the risk that they can freeze because a lot of water is accumulated in the sump before it is being discharged and cleaned in a second cleaning stage. A further disadvantage is that said fuel filters and the subsequent cleaning of the water are not designed for high pressures as they are common today.

It is the object of the present invention to improve a known fuel filter by means of a module insert for installation to the effect that the fuel filter is structured in particular more compact.

This problem is solved according to the invention by the subject matter of the independent claims. Advantageous embodiments are subject matter of the dependent claims.

Proposed is a module insert for installation in a liquid filter for cleaning the separated water, in particular for installation in a fuel filter, which comprises at least one water level sensor, at least one valve and at least one flow channel for the water, and at least one container having sorbent means for collecting contaminants from the separated water, wherein the module insert has a pressure-resistant housing by means of which the interior of the module insert is protected from the pressure of the fuel.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
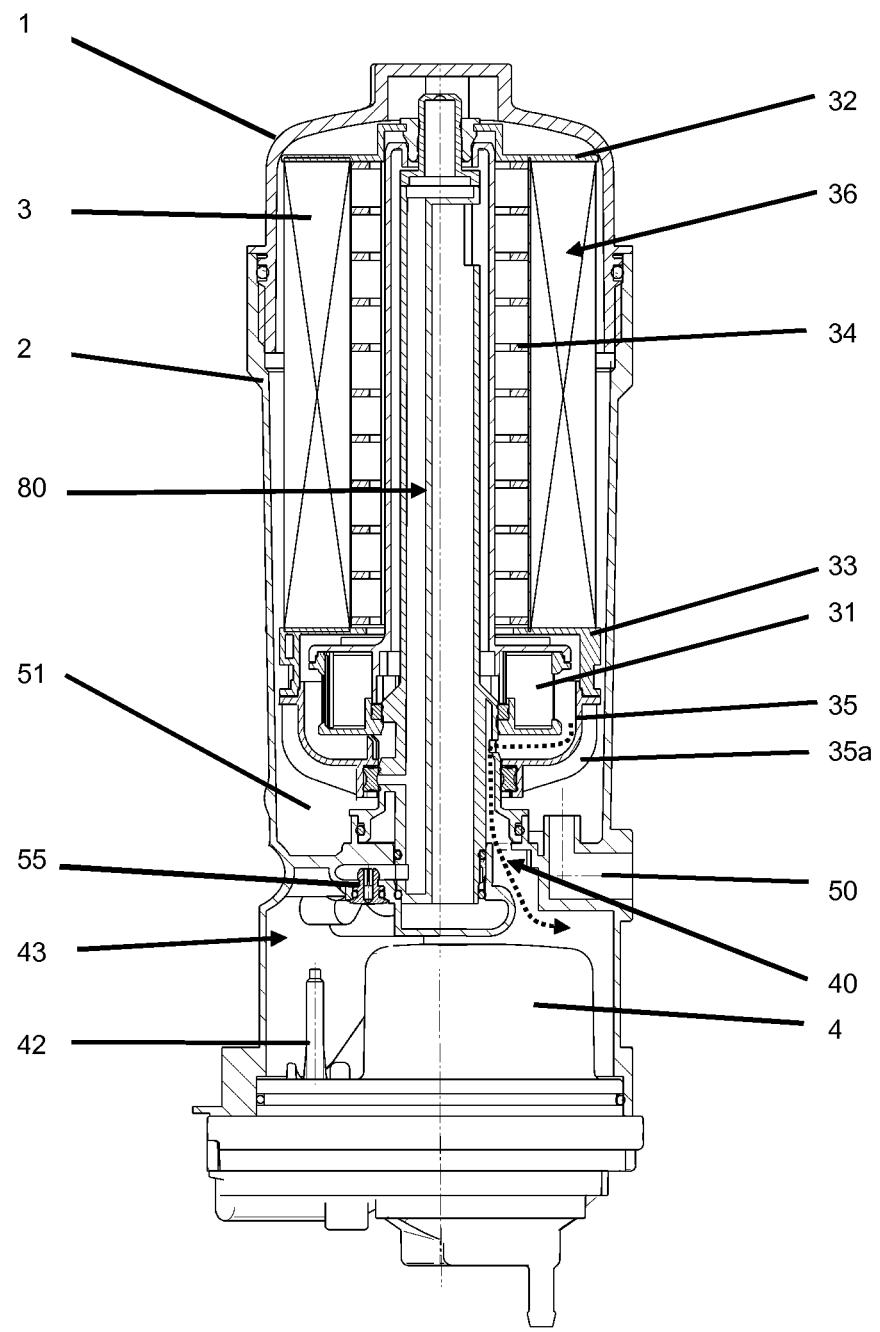
FIG. 1 shows a longitudinal section through a fuel filter according to the invention.

FIG. 1 shows a longitudinal section of a fuel filter according to the invention. At the top, a filter housing 2 which receives a filter element 3 as well as a module insert 4 is closed with a cover 1. Therebelow is a filter chamber 51 in which the fuel is cleaned from particulate material by means of the filter element 3. There is also a preliminary cleaning for coarser particles which is not shown here, however. The detailed structure of the filter element 3 is disclosed in the FIGS. 2 to 5. The filter element 3 consists of a cylindrical inner support fame 34 on which the special paper is seated as filter 36, and a lower end disk 33, a bottom 35 with external ribs 35a and a basket-shaped strainer 31. During the assembly of the fuel filter, said replaceable filter element 3 is slid over the functional support 80 which is fixedly attached in the filter housing 2 and conveys the media water and fuel.

The filter element 3 contains fine pored special paper or other materials as filter and the water present in the fuel can already coalescence here. In this case, the water flows as small droplets together with the fuel to the strainer 31. The fuel passes through said strainer and reaches the clean side and exits the fuel filter via the functional support 80 and adequate outlets (not shown). The basket-shaped strainer 31 is formed from lipophilic material in such a manner that the water droplets already present continue to get bigger and are subsequently transported downwards by gravity into a water collection chamber 43. The smaller the portion of particulate material in the fuel, the smaller is the fuel portion in the separated water; thus, the water separation is on the clean side of the filter element 3. The module insert 4 is inserted from underneath in the water collection chamber 43 and screwed to the filter housing 2 or is fastened in a different manner.

The path of the water is illustrated as arrow 40. The reference number 50 designates an inlet for the fuel; from here, the fuel gets into the fuel distribution chamber 51 and the fuel is pressed through the filter element 3 by the high pressure of approximately 5-10 bar in the fuel system.

Said high pressures with pressure peaks of more than 20 bar are also present in the water collection chamber 43. However, since the interior of the module insert 4 is not pressure-resistant, it is protected by a pressure-resistant housing 44. The interior of the module insert 4 is to be unpressurized in order that the water can discharge without being pressurized. The water level sensor 42 in the water collection chamber 43 ensures that the water, once it has reached a predetermined height, is discharged into the module insert 4. The water remains for some time in the water collection chamber 43; thereby, the still present fuel portion can accumulate above the standing water. Said fuel portion is sucked off via the throttle or valve 55 which is arranged in the functional support 80 and then flows back into the fuel tank.

Figure 2:
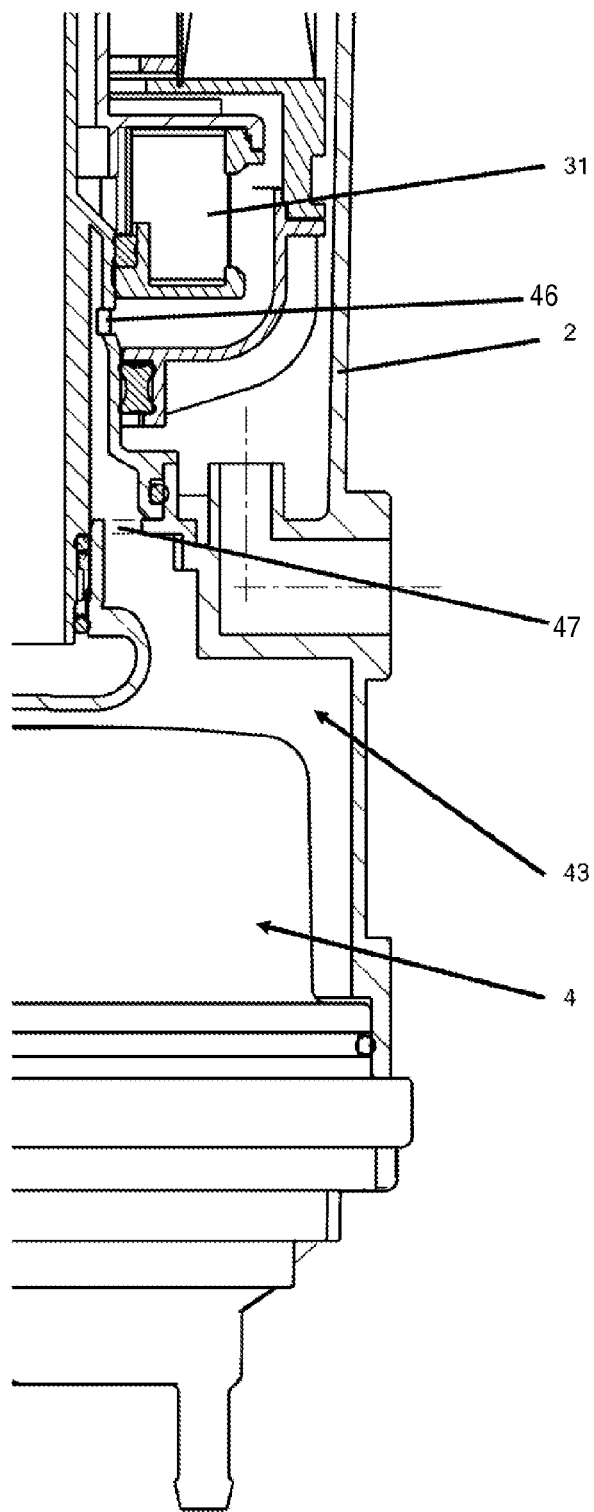
FIG. 2 shows a cut-out of FIG. 1.

FIG. 2 shows a cut-out of FIG. 1. It is shown how the water passes from the strainer 31 via the openings 46 and 47 into the water collection chamber 43. Through the outer shape of the pressure-resistant housing 44, the flow of the water in the water collection chamber 43 can be influenced, e.g., by providing calming zones in the form of projections in the water collection chamber 43 (not shown).

Figure 3:
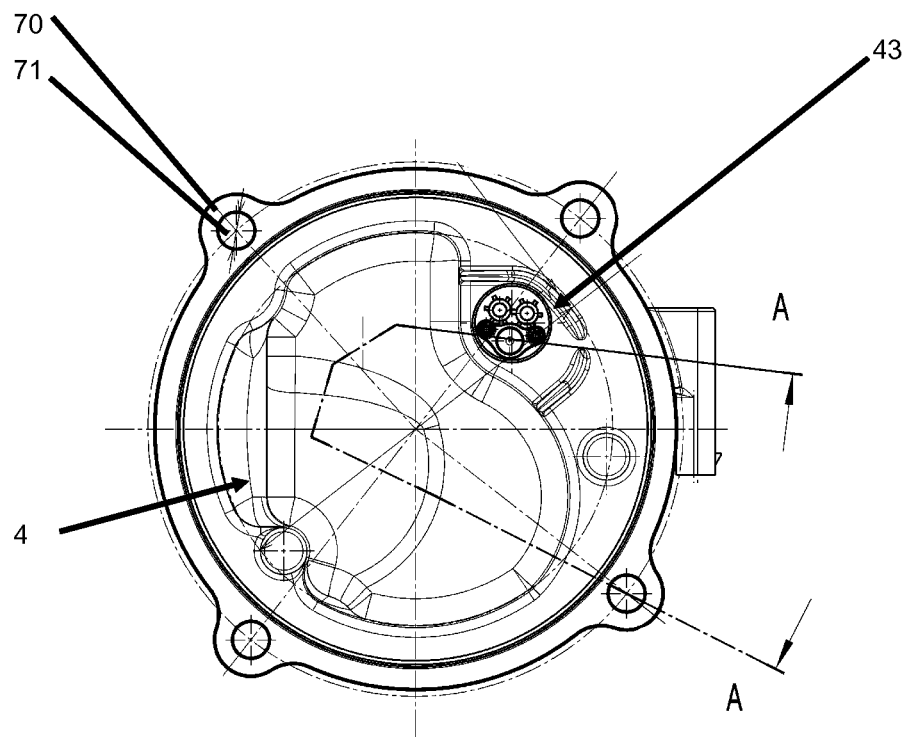
FIG. 3 shows a plane view of the module insert.

FIG. 3 shows a plane view of the module insert 4. In order to be able to receive at least one water level sensor 42, the pressure-resistant housing 44 deviates from the circular shape. By means of the openings 71 in the protrusions 70, the module insert 4 can be fastened to the filter housing 2, e.g., by means of screws.

Figure 4:
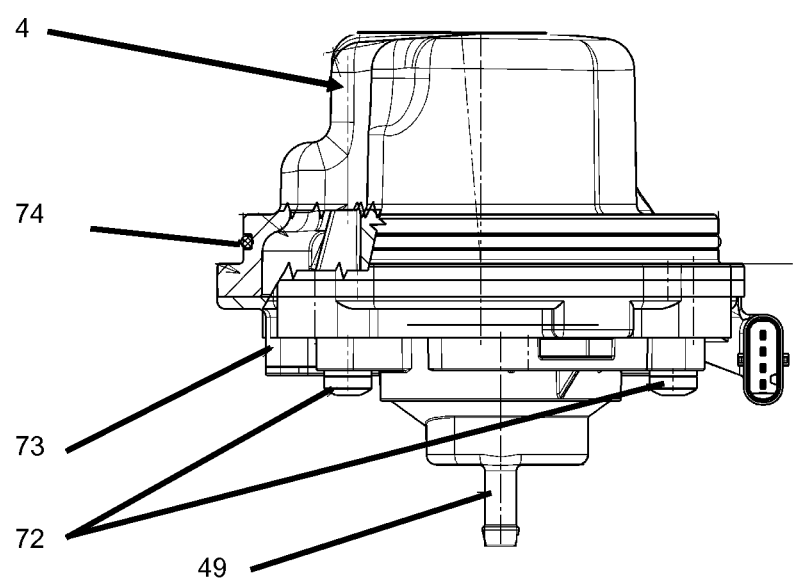
FIG. 4 shows a side view with section of the module insert.

FIG. 4 shows an exterior view of the module insert 4. It is a multi-piece construction with a pressure-resistant housing 44 on which a bottom 73 is mounted, e.g., by means of screws 72 or the like. For sealing with respect to the filter housing 2, a seal 74 is used. Via a drain 49, the purified and now clean water is discharged into the environment.

Figure 5:
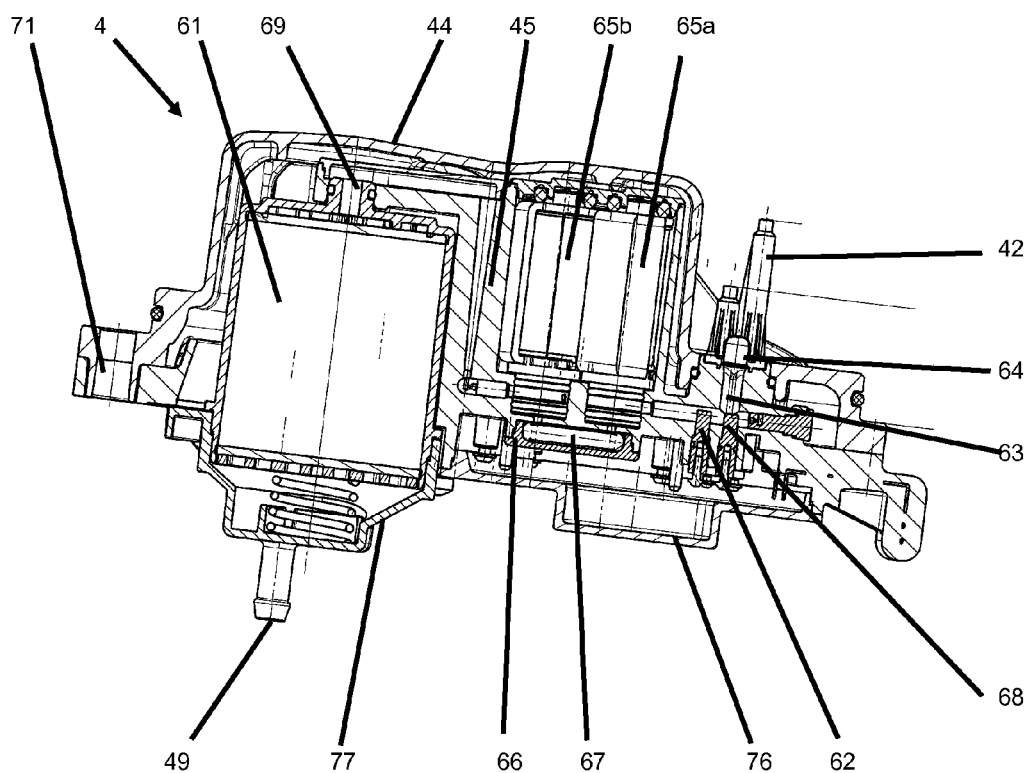
FIG. 5 shows a section of the module insert along the line A-A of FIG. 3.

FIG. 5 shows the interior of the module insert 4 along the section A-A of FIG. 3. The water separated from the fuel and accumulated in the water collection chamber 43 takes the following path when the water level sensors 42 open the valves 65 *a* and 65 *b*, e.g., solenoid valves. First, the water flows through a small strainer 64 into the flow channel 63 in which further sensors 62, 68 are located, and downstream of the flow channel 63, the two valves 65 *a* and 65 *b* are arranged. In the flow channel 66 between the valves 65 *a* and 65 *b*, a displacer element 67 is arranged which is intended to (prevent the water from freezing at this position; see also DE 10 2007 054 770 which is hereby incorporated by reference. Via the flow channel 69, the water finally gets into the container 61 which is configured as cleaning cartridge and thus can be replaced. The container 61 can contain different materials which sorb the remaining rest of fuel which is still contained in the discharged water. As sorbent material, the container 61 can contain activated carbon as well as a fuel-absorbing fabric, mesh, textiles, carpet or the like. Even the material of the container 61 can be made of a plastic which swells by absorbing fuel and thus extracts the residual fuel from the separated water. The aim is that the separated water contains only approximately 2 ppm residual fuel which is a proportion that is considered as being harmless for the environment.

The module insert 4 is composed of a pressure-resistant housing 44 and the inner part 45 in which the channels 63, 66 and 69 are arranged. The module insert 4 is closed from underneath, on the one hand, with a bottom 76 which is fixedly connected to the inner part 45 and, on the other, with a lower cover 77 which allows that the container/cleaning cartridge 61 can be changed. Alternatively, the lower cover 77 can also be fixedly connected to an inner part 45 and the pressure-resistant housing 44, e.g., by welding.

The water-conveying flow channel 69 and the container 61 in the module insert 4 which are downstream of the solenoid valves 65*a* and 65*b* should drain as slowly as possible to improve the adsorption conditions in the container 61. Optimal conditions exist in case of a certain flow of the separated water through the container 61; preferably, it flows from the bottom upwards or, alternatively, it also can flow from the top downwards as shown here. The flow channels 63, 66, 69 necessary for this are provided in the inner part 45 as needed.

Downstream of the solenoid valves 65*a/b*, the flow channel 69 is unpressurized and formed with air cushions; said volume reserve serves for absorbing volume changes, e.g. during freezing. For this reason, the pressure-resistant housing 44 is necessary for shielding this region from the pressure in the fuel. Due to the open ventilation of the drain 49 downstream of the container 61 with activated carbon filter, the water can drain off said region and lines (not shown) which are optionally connected downstream thereof.

There can also be a ventilation valve in the flow channel 69 and upstream of the container 61 which valve serves for allowing air to penetrate and the water to drain off the downstream container 61 and further lines connected to the drain 49. Said ventilation valve opens unpressurized or in case of negative pressure and closes in case of pressure (not shown). The further sensors 62, 68 can be a temperature sensor and a heater for thawing or for the operation at sub-zero temperatures, wherein the use of the temperature sensor 62 and/or 68 and the associated signal. processing have to ensure that the solenoid valves 65 cannot be opened at sub-zero temperatures.

The module insert 4 has an integrated structure, i.e., due to the flow channels 63, 66 and 69 integrated in the inner part 45, it contains the entire conduit for the water separated from the fuel. The module insert 4 provides the geometry for receiving the solenoid valves 65, it integrates the container 61 with the absorber in a fixed or replaceable manner, it is connected to the power supply, it conducts flows and signals or provides installation space for components for signal processing. Furthermore, the module insert receives the water level sensors 42 for the detection of water, which sensors project into the water collection chamber 43 of the filter housing 2. The solenoid valves 65 are arranged in such a manner that the solenoid valves 65 are closed when deenergized. The arrangement of the solenoid valves 65 is such that at least in case of one solenoid valve, the fuel pressure presses the valve shut and the valves has to open against the fuel pressure.

The module insert 4 has a three-piece structure for installation or integration into the fuel filter housing 2. The water collection chamber 43 is formed by the free spaces between module insert 4 and filter housing 2. A pressure-resistant housing 44 absorbs the forces caused by the fuel pressure. The pressure-resistant housing 44 can be made of aluminum or flame-resistant plastics thereby ensuring a leak-tightness for a sufficiently long time, even in case of a vehicle fire.

The invention claimed is:

1. A module insert comprising:
   at least one water level sensor, and
   a housing accommodating the water level sensor, the housing having an inlet coupled to a base having an outlet, wherein the housing encloses the base to delimit an interior including:
      at least one flow channel for communicating a fluid from the inlet to the outlet,
      at least one valve for controlling influx of the fluid via the inlet, and
      at least one container disposed downstream the at least one flow channel having a sorbent mechanism for collecting contaminants contained in the fluid, the at least one container including at least one conduit for communicating the fluid to the outlet, wherein the housing includes a pressure-resistant material configured to protect the interior from exterior pressure.

2. The module insert according to claim 1, wherein the at least one flow channel includes a displacer element configured to provide protection against freezing.

3. The module insert according to claim 1, further comprising at least two solenoid valves for controlling a flow of fluid in the at least one flow channel.

4. The module insert according to claim 1, wherein the sorbent mechanism is activated carbon.

5. The module insert according to claim 1, wherein the contaminants includes fuel, and the sorbent mechanism includes at least one of a fabric and a mesh configured to store fuel.

6. The module insert according to claim 1, wherein the base includes a removable lower cover disposed below the container, wherein the container is a replaceable cartridge containing the sorbent mechanism.

7. The module insert according to any claim 1, wherein the container is made of plastic and is configured to store the contaminants.

8. The module insert according to claim 7, wherein the sorbent mechanism is contained in the container.

9. The module insert according to claim 1, wherein the pressure-resistant material is at least one of aluminum and flame-resistant plastic.

10. The module insert according to claim 1, further comprising at least two water level sensors configured to detect two different water levels.

11. The module insert according to claim 1, further comprising throttles disposed in the at least one flow channel to control a flow of the fluid.

12. The module insert according to claim 1, further comprising a heater disposed in the at least one flow channel for preventing freezing.

13. A fuel filter, comprising:
a filter housing having an inlet and an outlet for a fluid to be filtered, the filter housing including a functional support coupled thereto;
a replaceable filter element disposed in the filter housing arranged coaxially to the functional support;
a water collection chamber disposed downstream the filter element configured to store water separated from the fluid; and
a module insert secured to the filter housing configured to treat the separated water stored in the water collection chamber, the module insert including:
a housing having an untreated-side inlet coupled to a base having a treated-side outlet, the housing including a geometry accommodating a water level sensor, the housing geometry and sensor projecting into the water collection chamber configured to shape free spaces in the water collection chamber, wherein the housing encloses the base and delimits an interior including:
at least one flow channel for communicating the separated water from the untreated-side inlet to the treated-side outlet;
at least one valve for controlling influx of the separated water via the untreated-side inlet;
at least one container disposed downstream the at least one flow channel having a sorbent mechanism for cleaning contaminants from the separated water, the container including at least one conduit for communicating the separated water to the treated-side outlet;
wherein the housing includes a pressure-resistant material configured to protect the interior from exterior pressure.

14. The fuel filter according to claim 13, wherein the filter housing and the functional support together form supply and discharge lines to the filter element.

15. The fuel filter according to claim 13, wherein the base includes a fixedly removable cover disposed below the container, wherein the container is a replaceable cartridge.

16. The fuel filter according to claim 13, wherein the at least one flow channel includes a displacer element configured to provide protection against freezing, the displacer element compressible in response to a force.

17. The fuel filter according to claim 13, wherein the sorbent mechanism is at least one of a fabric and a mesh configured to store the contaminant.

18. The fuel filter according to claim 13, wherein the pressure-resistant material is at least one of aluminum and flame-resistant plastic.

19. The fuel filter according to claim 13, further comprising at least two water level sensors configured to detect two different water levels within the water collection chamber.

20. The fuel filter according to claim 13, further comprising a heater disposed in the at least one flow channel for preventing freezing.

* * * * *